United States Patent [19]

Enns et al.

[11] Patent Number: 5,072,449
[45] Date of Patent: Dec. 10, 1991

[54] PACKET FRAMING USING CYCLIC REDUNDANCY CHECKING

[75] Inventors: Frederick Enns, Menlo Park; J. Paul O'Hare, Felton, both of Calif.

[73] Assignee: Stratacom, Inc., Campbell, Calif.

[21] Appl. No.: 481,709

[22] Filed: Feb. 15, 1990

Related U.S. Application Data

[63] Continuation-in-part of Ser. No. 454,258, Dec. 21, 1989, abandoned.

[51] Int. Cl.$^5$ .......................... G06F 11/10; H04J 3/24
[52] U.S. Cl. .................................. 371/37.1; 370/94.2; 370/105.1; 375/108
[58] Field of Search .................. 371/37.1, 47.1, 46; 371/42, 53, 54, 20.1; 370/105, 105.1, 106, 100.1, 94.1, 94.2, 14; 375/108, 114, 116

[56] References Cited

U.S. PATENT DOCUMENTS

| | | | |
|---|---|---|---|
| 4,316,285 | 2/1982 | Bobilin | 371/47.1 X |
| 4,397,020 | 8/1983 | Howson | 371/37.1 X |
| 4,468,752 | 8/1984 | Chatham | 370/100.1 X |
| 4,754,451 | 6/1988 | Eng | 370/60 |
| 4,897,835 | 1/1990 | Gaskill | 370/94.1 |
| 4,914,654 | 4/1990 | Matsuda | 370/94.1 |
| 4,962,498 | 10/1990 | May | 370/94.1 |

*Primary Examiner*—Robert W. Beausoliel
*Attorney, Agent, or Firm*—Flehr, Hohbach, Test, Albritton & Herbert

[57] ABSTRACT

Packets transported over a serial data stream need to have their start and stop information encoded so that they can be parsed by the receiving device. Techniques used in various standards require extra bandwidth to carry this information. For framed data streams like T1, proprietary protocols have used the frame structure to mark packet boundaries. Both types of solutions are undesirable for unframed, long distance data streams like the CCITT G.703 2.048 Mbps unframed service, subrate trunks, or fractional T1 services. The present invention provides a packet framing method that uses the Cyclic Redundancy Check (CRC) found in most packet formats. The protocol does not require any extra bandwidth and can work with any serial data stream physical layer.

2 Claims, 5 Drawing Sheets

FRAMING ALGORITHM STATE MACHINE

| 7 | 6 | 5 | 4 | 3 | 2 | 1 | 0 |

| | | | | | | |
|---|---|---|---|---|---|---|
| A | A | A | A | A | A | A | A |
| A | A | A | A | A | A | A | A |
| T | T | T | C | C | C | C | C |
| S | S | S | S | S | S | S | S |
| D | D | D | D | D | D | D | D |

BYTE 1: A = PACKET ADDRESS BITS.
BYTE 2.
BYTE 3: T = PACKET TYPE, C = CRC.
BYTE 4: S = TIME STAMP OR USER DATA.
BYTE 5 TO 24: USER DATA.

IPX PACKET FORMAT

FRAMING ALGORITHM STATE MACHINE

|  | E1 2.048Mbps | 64Kbps | 56Kbps |
|---|---|---|---|
| WORST CASE BUSY LINE | 5.9 | 188 | 215 |
| TYPICAL BUSY LINE | 2.4 | 77 | 87 |
| WORST CASE IDLE LINE | 4.1 | 130 | 149 |
| TYPICAL IDLE LINE | 1.5 | 48 | 54 |

TABLE 1: PACKET FRAMING TIMES IN MSEC FOR TRUNKS WITHOUT BYTE ALIGNMENT

FIG. 3

|  | E1 1.984Mbps | T1 1.536Kbps | (FRAC. T1) 64Kbps |
|---|---|---|---|
| WORST CASE BUSY LINE | 0.98 | 1.2 | 30 |
| TYPICAL BUSY LINE | 0.61 | 0.79 | 18.9 |
| WORST CASE IDLE LINE | 0.45 | 0.58 | 14 |
| TYPICAL IDLE LINE | 0.26 | 0.33 | 8.0 |

TABLE 2: PACKET FRAMING TIMES IN MSEC FOR TRUNKS WITH BYTE ALIGNMENT

FIG. 4

|  | CYCLES USED PER 125 USEC. | PERCENT UTILIZATION |
|---|---|---|
| SEARCH MODE | 1660 | 66% |
| MONITOR MODE | 1200 | 48% |

2500 INSTRUCTIONS PER 125 USEC PERIOD

TABLE 3: NTC DEFRAMER PROCESSOR UTILIZATION

FIG. 5

|  | CYCLES USED PER 125 USEC. | PERCENT UTILIZATION |
|---|---|---|
| TRANSMIT MODE | 1660 | 66% |

2500 INSTRUCTIONS PER 125 USEC PERIOD

TABLE 3: NTC FRAMER PROCESSOR UTILIZATION

FIG. 6

DEFRAMER ARCHITECTURE

FRAMER ARCHITECTURE

PACKET FRAMING USING CYCLIC REDUNDANCY CHECKING

This is a continuation-in-part of application Ser. No. 454,258 filed Dec. 21, 1989 now abandoned.

BACKGROUND OF THE INVENTION

The present invention relates to a data communications system and method utilizing packet framing techniques.

Serial data streams that use packet protocols to transfer information need to establish byte alignment of the data and mark the beginning and end of the packets.

In the past various methods have been used to accomplish these tasks. HDLC (High-level Data Line Control) protocols use a unique eight bit flag to mark a packet's start and end. Inside the packet the data is bit stuffed to prevent an accidental flag from being sent. The 802.3 "Ethernet" standard is typical of another set of protocols which use an idle preamble followed by a non-idle packet start header to mark the beginning of a packet.

These methods have worked well in applications where bandwidth efficiency has not been an issue. However in telecommunications, the customer typically rents bandwidth from a service provider. Protocols for this application have to maximize the bandwidth available for the customer's data to save money on the purchased service. The framing algorithm should have as low an overhead as possible. For example if 24 bytes of user data were carried in an HDLC framed packet, it could have as much as 27 bits of data stuffed into it to prevent a false flag.

To this would be added a start and end flag of eight bits each. Such a worst case packet would have a 22% packet framing overhead. For a T1 line which can cost hundreds or thousands of dollars a month, this is expensive.

StrataCom, Inc. manufactures a digital multiplexer (known as the Integrated Packet Exchange (IPX)) that connects customer's voice and data equipment together over T1 lines using a packet transport protocol. That IPX multiplier is described in U.S. Pat. No. 4,771,425, the details of which are hereby incorporated by reference.

Presently the IPX solves the problem of framing packets on T1 lines by making all of its packets 24 bytes long and placing them inside a T1 frame. The T1 frame format has one framing bit and 24 bytes of data; 193 bits total. The T1 framing bit is required for the line to use T1 vendor services. Therefore, this packet framing, which is the same as the T1 line framing, needs no extra bandwidth.

This solution does not work with other types of trunk interfaces and for packets that are not 24 bytes long. Fractional T1 and framed E1 (E1 is the 2.048 Mbps trunk defined by CCITT G.703 standard) can supply byte alignment but do not have 24 bytes per frame for the packet alignment needed by the IPX packet protocol. Unframed E1 (Britin's Mega-Stream), V.11 (Britain's Kilo-Stream and France's Transfix) and V.35 sub-rate trunks do not have either byte or packet alignment signals in their physical interface.

SUMMARY OF THE INVENTION

It is an object of the present invention to provide an improved data communications system and method utilizing packet framing techniques.

It is a more particular object of the present invention to provide packet framing using cyclic redundancy checking.

The CRC packet framing algorithm described below is a protocol that byte aligns and packet frames a serial bit stream from the existing data structure in common packet formats. It achieves packet framing without additional bandwidth overhead.

A solution to the packet framing problem must use as little bandwidth as possible, be transparent to the user's data, accommodate high packet throughput rate, and be robust. By robust, it is meant that the algorithm must be fast in recovering from errors, it must achieve quick packet alignment (T1 synchronization times of 10 msec are acceptable), and it should have low error multiplication (a transmission error affecting the framing algorithm should not cause a large amount of data to be lost).

Other objects, features and advantages of the present invention will become apparent from the following detailed description when taken in conjunction with the accompanying drawings.

BRIEF DESCRIPTION OF THE DRAWINGS

The accompanying drawings which are incorporated in and form a part of this specification illustrate an embodiment of the invention and, together with the description, serve to explain the principles of the invention.

FIG. 3 depicts a table illustrating packet framing time for trunks without byte alignment.

FIG. 4 depicts a table showing packet framing times for trunks with byte alignment.

FIG. 5 depicts a table illustrating deframer processor utilization.

FIG. 6 depicts a table illustrating framer processor utilization.

DETAILED DESCRIPTION OF THE DRAWINGS

Reference will now be made in detail to the preferred embodiment of the invention, an example of which is illustrated in the accompanying drawings. While the invention will be described in conjunction with the preferred embodiment, it will be understood that it is not intended to limit the invention to that embodiment. On the contrary, it is intended to cover alternatives, modifications and equivalents as may be included within the spirit and scope of the invention as defined by the appended claims.

PROTOCOL DESCRIPTION

The CRC packet framing technique can be applied to any packet format that has an error checking code embedded in it. Described here is the way packet framing is achieved using one preferred packet format with its CRC code.

Figures 1, 2:
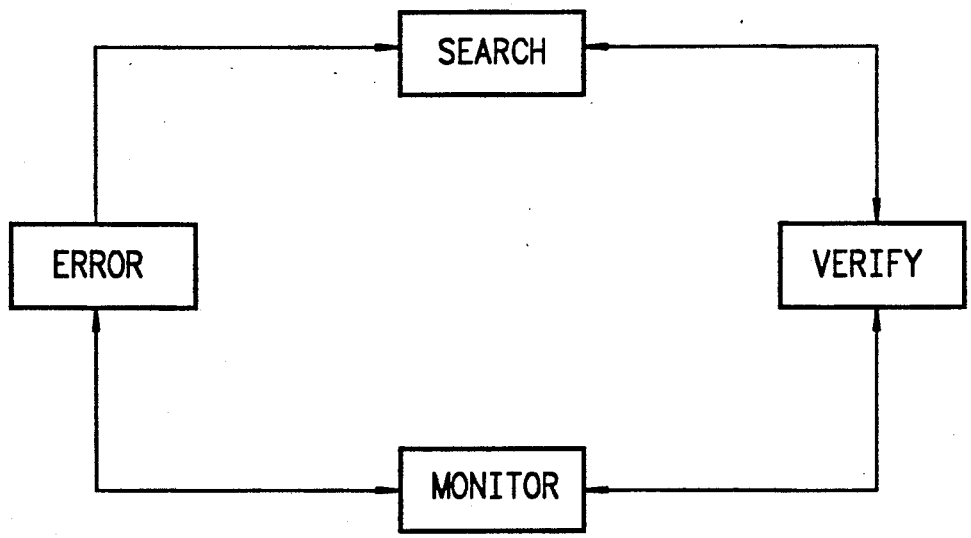
FIG. 1 depicts an IPX packet format for describing the operation of the present invention.
FIG. 2 depicts a framing algorithm state machine for describing the operation of the present invention.

Referring now to FIG. 1, the IPX packet format is a fixed 24 byte packet that contains either a three or four byte header depending on the packet type, see FIG. 1. The first two bytes (Bytes 1 and 2) are the packet's destination address. The third byte contains a three bit packet type identification number and a five bit Cyclic Redundancy types of packets; it contains a time stamp. The CRC is calculated over the first four bytes of the packet regardless of whether the packet type has a time stamp byte or not.

A framing algorithm state machine is shown in FIG. 2. The CRC framing algorithm has four states. The machine initializes itself in the "Search" state. The "Search" state looks for a good CRC in the serial bit stream. When a good CRC is found the algorithm enters a "Verify" state where it checks consecutive packets for good CRC to make sure that the packet frame boundary has been found. If there is a bad CRC in the "Verify" state, the algorithm returns to the "Search" state.

In the "Verify" state a packet is good if its CRC and the CRC of the next packet are correct. If the verification is successful then the "Monitor" state is entered. In this state the algorithm enables the receiver to store packets and it continues to check the received packet's CRC. If a bad CRC is found the algorithm goes to an "Error" state. In the "Error" state, good packets continue to be received and the CRC checked. A packet framed by good CRCs immediately returns the algorithm to "Monitor" state; consecutive bad CRC checks puts the algorithm in the "Search" state.

In the "Search" state the CRC framing algorithm looks at the serial bit stream for bit sequences that have a valid check sum. In the case of the IPX format, the algorithm looks for a valid CRC(5) over a 32 bit span of data.

Figure 7:
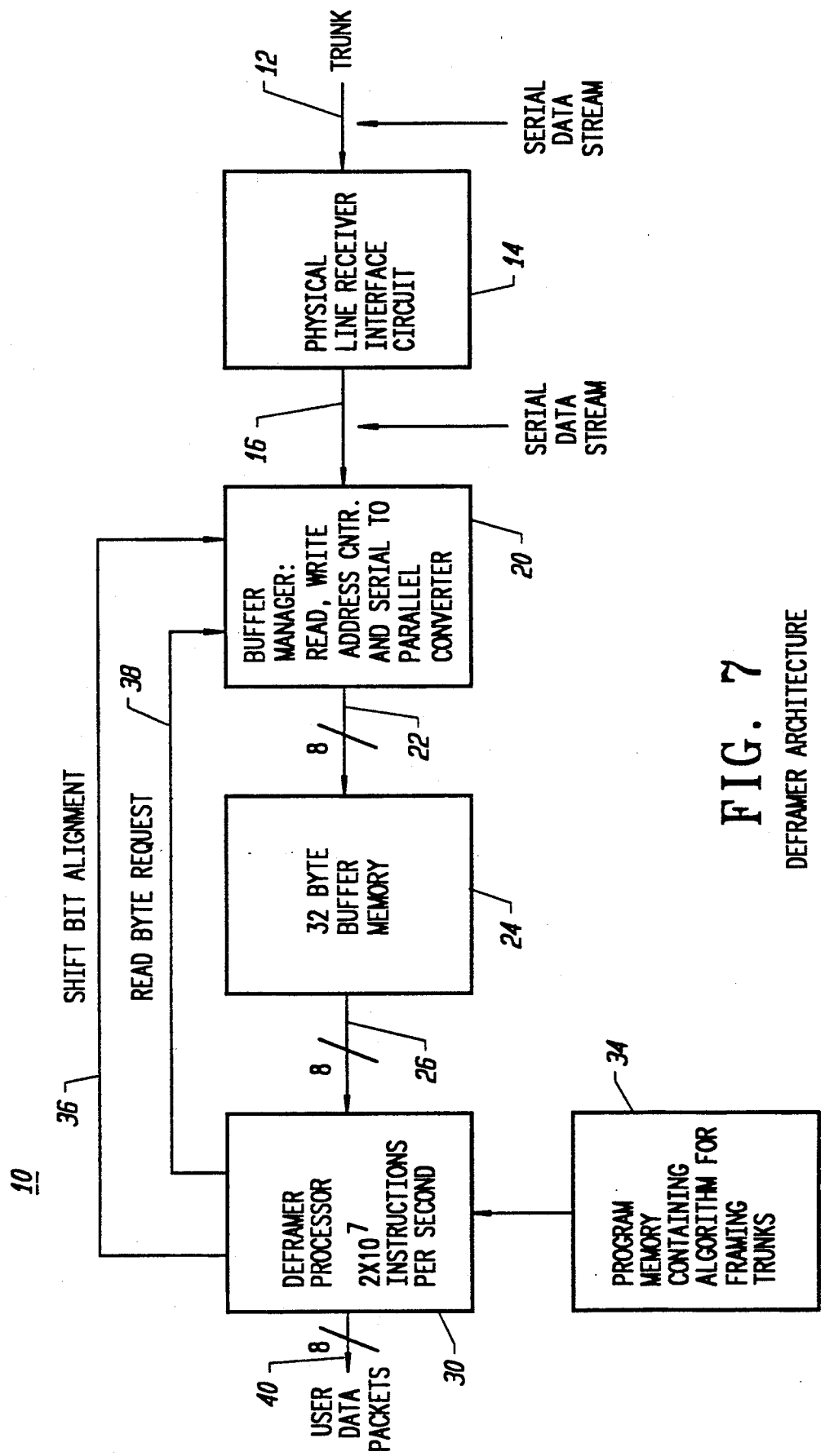
FIG. 7 depicts deframer architecture utilized with the present invention.
Figure 8:
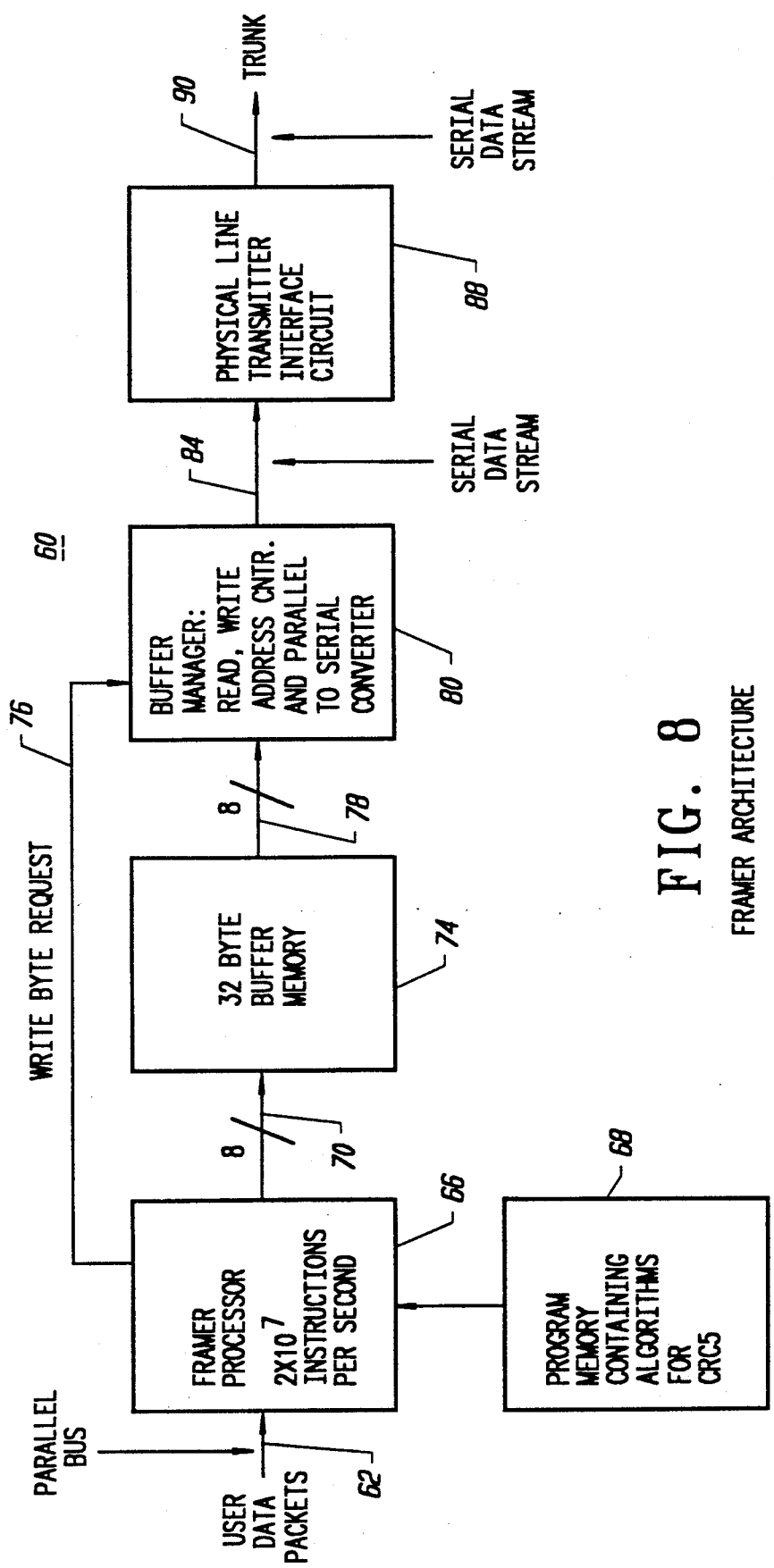
FIG. 8 depicts framer architecture utilized with the present invention.

The specific IPX framing implementation is executed by a micro processor and a hardware receive buffer that can be bit aligned. The framing architecture is shown in FIG. 8 and the deframer architecture is shown in FIG. 7.

The buffer is one byte wide and it receives data directly from the line interface chips. The processor can control the bit alignment within the byte of the data put into the buffer by the interface. The framing algorithm is optimized so that the processor's real time requirements in the search phase are kept low.

This is done by having the processor scan a window of 32 bits from the hardware buffer for good CRC and then discarding the data if the check fails. The processor is freed from the bit manipulations of data that would be required if it were to look for all the possible patterns within a window of data. The time required to find a packet frame boundary is increased because data is discarded, but doing so makes the real time requirements of the processor easier to estimate and engineer. On a given byte boundary, the processor checks six windows of 32 bits each for two good CRC's framing a packet. If no match is found, the processor shifts the bit alignment of the hardware buffer. The CRC is then checked over another six windows (24 bytes) of data. The algorithm continues bit shifting until a good CRC is found. Two good CRCs framing a packet changes the algorithm's state from "Search" to "Verify".

The "Verify" mode is used to insure that an accidental CRC match is not used to frame the packet line. For the IPX the CRC(5) has a probability of one chance in thirty two of finding a good CRC in random data. The "Verify" state requires four packets in a row be framed by five good CRCs to frame synchronize the line. For random data the probability of a false frame is $3*10^{-8}$. No packets are accepted by the receiver state machine in the "Verify" state.

Packet boundaries used to calculate CRCs in the "Verify", "Monitor", and "Error" states are determined by the packet length. Normal IPX packets have a fixed, 24 byte length. A special four byte long "Idle Trunk Packet" is used between IPX nodes when no user data packets are available to send. The "Idle" packet's shorter length helps speed the packet framing processes. A special IPX packet address (see FIG. 1) is used to identify the "Idle" packet.

When a good CRC sequence is found in the "Verify" state the line is considered to be synchronized to both the data stream's byte boundary and to the packet frame. The framing algorithm then goes to the "Monitor" state and packet reception starts.

If in the "Monitor" state a bad CRC is found, caused by either a transmission error or a loss of synchronization, then the "Error" state in entered. The "Error" state checks the packet framing synchronization without throwing out good packets or shifting the frame byte boundary. This prevents a simple line error from affecting more than one packet (error multiplication). For the IPX, desynchronization is not started until forty eight bytes of data are checked and no good, CRC framed packet is found.

A pseudo code implementation of the IPX algorithm is given in Appendix A.

The algorithm is flexible. It can be applied to more than the IPX packet protocol. The CRC can be different sizes (ie. CRC(8), CRC(16)); the CRC can cover some or all of a packet; and the packets can have a variable length. For variable length packets, the length field can be read to know where the next packet should start.

If the trunk has its own byte framing built in like T1 or framed E1, the CRC framing algorithm saves time by only doing byte shifts of the data stream to find the packet boundaries.

CRC PACKET FRAMING PERFORMANCE FOR THE IPX

Bandwidth:

No extra bandwidth required; the framing is done with the existing packet's CRC.

CRC (5) Characteristics:

The CRC(5) used by the IPX is five bits long, covers 32 bits (including itself), and uses the polynomial: $X^5+X^4+X^3+X^2+X^0=61$ (decimal)—

The error coverage for 32 bits is:

100% of single bit errors.

97% of double bit errors.

100% of bursts less than 5 bits long.

97% of random data patterns.

Time to Frame a Line:

The time to packet frame a line depends on the data rate of the line, whether the line's data is byte aligned or not, the nature of the data pattern on the line, and how many "Idle" packets are being sent.

Four types of times are calculated; worst case busy, worst case idle, typical busy, and typical idle.

The "Worst Case" times assume the worst bit and byte alignment requiring the most shifts and searches. They also assume that all the data is random. The number of false CRC's seen is one standard deviation greater than the mean expected number. The worst case probabilities in Table 1 are 0.2%, in Table 2 they are 2%.

The "Typical Case" times use average numbers for the number of bit and byte shifts and for the number of false CRCs.

All the T1 and E1 trunk packet framing times compare favorably with T1 line framing times in the 10 msec range.

Error Multiplication:

When an error is detected in the "Monitor" state, the IPX packet receiver drops that packet and goes to the "Error" state. Good CRC packets in the "Error" state are transmitted on the IPX bus. For a bit error in the packet header, error multiplication is limited to loosing one packet of up to 21 bytes of customer data. This is the same error multiplication as in the current IPX product without CRC packet framing.

Robustness:

The packet framing algorithm is inherently robust. The "Verify" state checks that the line has not falsely framed to an erroneous packet boundary. The probability of a false frame is $3 \times 10^{-8}$. Even if a line were to falsely frame, the "Monitor" state constantly checks for loss of packet frame synchronization. In such a circumstance the "Error" state would re-initiate the packet frame search.

Packet Throughput:

The IPX Network Trunk Card (NTC) implements the CRC packet framing algorithm with two processors; a Framer (transmit to the line) and a Deframer (receive from the line). The real time required for each processor has been estimated for their complete set of tasks which include functions in addition to CRC framing and deframing. The numbers in Tables 3 and 4 are worst case averages of processor utilization based on simulations of the code and data. Each processor has 2500 instruction cycles available to it in a 125 microsecond period.

Data Transparency:

The CRC packet framing algorithm places no constraints on the user's data. False CRC matches within the data do not permanently keep the algorithm from finding the correct packet frame alignment.

Referring now to FIG. 7, deframer architecture 10 according to the present invention is shown, in which serial data stream via trunk 12 is input to a physical line receiver interface circuit 14. The output of circuit is a serial data stream on bus 16 which is input to a buffer manager 20.

Buffer manager 20 includes a read/write address counter and serial to parallel converter for outputting 8-bit data on bus 22 to 32-byte buffer memory 24.

The output of memory 24 on 8-bit bus 26 is input to a deframer processor 30 which processes $2 \times 10^7$ instructions per second.

The deframer processor 30 provides a shift bit alignment signal on lead 36 to buffer manager 20. Also, deframer processor 30 provides a read/write request signal on lead to buffer manager 20.

Deframer processor 30 receives control information from a program memory 34. The control information contains an algorithm for framing the trunks. The output of deframer processor 30 is 8-bit bus 40 carrying user data packets.

FIG. 8 depicts a framer architecture 60 according to the present invention. In FIG. 8, the framer architecture includes a frame processor 66 which receives user data packets on parallel bus 62. Frame processor 66 processes $2 \times 10^7$ instructions per second.

The output of framer processor 66 is via 8-bit bus 70 to 32-byte buffer memory 74.

The output of memory 74 is via 8-bit bus 78 to a buffer manager 80 which includes a read/write address counter and parallel to serial converter.

Framer processor provides a write byte request signal on lead 76 to buffer manager 80. Framer processor receives instructions from program memory 68 containing control algorithms for a cyclic redundancy check according to the present invention.

The output of buffer manager 80 is a serial data stream on lead 84 which is connected to physical line transmitter circuit 88 for output as a serial data stream to trunk 90.

The foregoing description of the preferred embodiment of the invention has been presented for purposes of illustration and description. It is not intended to be exhaustive or to limit the invention to the precise form disclosed, and many modifications and variations are possible in light of the above teaching. For example, error detection information in general could be utilized with the present invention. The preferred embodiment utilizing cyclic redundancy checking was chosen and described in order to best explain the principles of the invention and its practical applications to thereby enable others skilled in the art to best utilize the invention and various embodiments and with various modifications as are suited to the particular use contemplated. It is intended that the scope of the invention be defined only by the claims appended hereto.

---

Appendix A: The IPX Pseudo Code Packet Framing Algorithm

```
DEFRAMER ( )
{
STATE = SEARCH;         /* INITIAL CONDITION */
IF (LINE = T1 OR E1_31_CHANNEL OR
    E1_30_CHANNEL OR
    FRAC_T1 THEN SET LINE_TYPE = FRAMED);
ELSE (LINE_TYPE = UNFRAMED);
WHILE (NON-STOP)
    {
    SWITCH (STATE)
        {
        CASE SEARCH:    SEARCH ( );
                        BREAK;
        CASE VERIFY:    VERIFY ( );
                        BREAK;
        CASE MONITOR:   MONITOR ( );
                        BREAK;
        CASE ERROR;     ERROR ( );
                        BREAK;
        }
    }
}
SEARCH ( )
{
SEARCH_STATUS = NOT_FOUND;
WHILE (SEARCH_STATUS = NOT_FOUND)
    {
    FOR (BYTECNT = 0; BYTECNT < 48;
    BYTECNT=BYTECNT+4)
        {
        IF (NEXT FOUR BYTES HAVE A GOOD CRC AND
        THE NEXT PACKET IS FOLLOWED BY A
        GOOD CRC)
            {
            SEARCH_STATUS = FOUND;
            STATE = VERIFY;
            }
        }
    IF (LINE_TYPE = UNFRAMED) SHIFT HARDWARE
        BUFFER ONE BIT ( );
    }
```

-continued

Appendix A: The IPX Pseudo Code Packet Framing Algorithm

```
}
VERIFY ( )
{
VERIFY_STATUS = NOT VERIFIED;
WHILE (VERIFY_STATUS = NOT_VERIFIED)
    {
    FOR (CRC_CNT = 0; CRC_CNT < 4;
    CRC_CNT=CRC_CNT+4)
        {
        IF (BAD CRC ON NEXT EXPECTED PACKET
        BOUNDARY)
            {
            STATE = SEARCH;
            BREAK;
            }
        }
    VERIFY_STATUS = VERIFIED;
    /* FOUR GOOD PACKETS */
    }
IF (STATE = SEARCH) STATE = MONITOR;
}
MONITOR ( )
{
MONITOR_STATUS = CRC_OK;
WHILE (MONITOR_STATUS = CRC_OK)
    {
    IF (GOOD CRC ON NEXT EXPECTED PKT
    BOUNDARY)
        {
        IF (LAST PACKET WAS 24 BYTES)
            WRITE LAST PACKET TO MUXBUS ( );
        }
    ELSE            /* BAD CRC */
        {
        MONITOR_STATUS = CRC_BAD;
        STATE = ERROR;
        }
    }
}
ERROR ( )
{
FOR (BYTE_CNT = 0; BYTE_CNT < 48;
BYTE_CNT=BYTE_CNT+4)
    {
    IF (NEXT 4 BYTES HAVE GOOD CRC)
        {
        IF THIS IS AN EXPECTED BOUNDARY OF EITHER
        A 4 OR 24 BYTE PACKET, WHOSE START WAS
        FOUND IN THE MONITOR STATE OR THIS IS A
        GOOD CRC FOUND IN THIS THE ERROR STATE
        THEN
            {
            STATE = MONITOR;
            }
        }
    }              /* END OF FRAME SYNC */
STATE = SEARCH;
}
```

What is claimed is:

1. In a data communication system, a packet boundary detection method comprising the steps of transmitting to a destination address a serial bit data stream containing packet information including a multi-byte header having a packet destination address and error detection information, said error detection information being a multi-bit cyclic redundancy check (CRC) sum, detecting said packet boundary including decoding said packet information at said destination address based upon said error detection information, transmitting to a destination address a serial bit data stream containing packet information including a multi-byte header having a packet destination address and a multi-bit cyclic redundancy check (CRC) sum, initially searching said serial bit stream in a search mode for a good or verifiable CRC, verifying in a verify mode said verifiable CRC, monitoring in a monitor mode said CRC sum for an error, including continuously checking CRC received packets containing received CRC data, entering an error mode if a bad CRC is found, including continuously checking said CRC sum for good packets, returning to said monitoring mode if good CRC's are received, and returning to said searching mode if consecutive bad CRC's are found.

2. In a data communication system, packet boundary detection apparatus comprising means for transmitting to a destination address a serial bit data stream containing packet information including a multi-byte header having a packet destination address and error detection information, said error detection information being a multi-bit cyclic redundancy check (CRC) sum, packet boundary detection means including means for decoding said packet information at said destination address based upon said error detection information, means for initially searching said serial bit stream in a search mode for a good or verifiable CRC, means for verifying in a verify mode said verifiable CRC, means for monitoring in a monitor mode said CRC sum for an error, including continuously checking received CRC packets containing received CRC data, means of entering an error mode if a bad CRC is found, including continuously checking said CRC sum for good packets, means for returning to said monitoring mode if good CRC's are received, and means for returning to said searching mode if consecutive bad CRC's are found.

* * * * *